United States Patent

Chaney et al.

[11] Patent Number: 5,341,702
[45] Date of Patent: Aug. 30, 1994

[54] APPARATUS FOR CALIBRATION OF AN ANGULAR DISPLACEMENT

[75] Inventors: Raymond J. Chaney, Berkeley; Jeffrey Graham, Wotton-Under-Edge, both of United Kingdom

[73] Assignee: Renishaw Transducer Systems Limited, Gloucestershire, United Kingdom

[21] Appl. No.: 39,188

[22] PCT Filed: Sep. 10, 1992

[86] PCT No.: PCT/GB92/01653
§ 371 Date: Apr. 13, 1993
§ 102(e) Date: Apr. 13, 1993

[87] PCT Pub. No.: WO93/05360
PCT Pub. Date: Mar. 18, 1993

[30] Foreign Application Priority Data
Sep. 10, 1991 [GB] United Kingdom ............. 9119304.5

[51] Int. Cl.$^5$ .................. B23B 29/24; B23Q 16/00
[52] U.S. Cl. .................... 74/821; 74/813 R; 74/816; 74/826
[58] Field of Search .............. 74/813 R, 815, 816, 74/821, 813 C, 826

[56] References Cited

U.S. PATENT DOCUMENTS

| 3,277,789 | 10/1966 | Graham | 74/816 X |
|---|---|---|---|
| 3,518,899 | 7/1970 | Greenberg et al. | 74/821 |
| 3,543,609 | 12/1970 | Borodin | 74/821 X |
| 3,572,175 | 3/1971 | Deprez | 74/821 X |
| 3,593,597 | 7/1971 | Jennings | 74/826 X |
| 3,653,282 | 4/1972 | Bouffiou et al. | 74/821 X |
| 3,782,226 | 1/1974 | Boyd et al. | 74/826 X |
| 4,189,963 | 2/1980 | Sano et al. | 74/821 |

FOREIGN PATENT DOCUMENTS 2484887 12/1981 France ................. 74/816
2197478 5/1988 United Kingdom .

OTHER PUBLICATIONS

Hewlett Packard Journal, Apr. 1983, R. R. Baldwin et al.: "Laser Optical Components for Machine Tool and Other Calibrations: Angular Optics" pp. 14–16.
Measurement Techniques, vol. 27, No. 11, Nov. 1984 (New York, US), Yu. P. Darmenko: "Calibrating Circular Angle Digitizers" pp. 982–985.
Measurement Techniques, vol. 20, No. 7, Jul. 1977, (New York US), B. E. Blanter: "Experiment Study of Accuracy of Magnetic Angle Converters" pp. 990–994.
Measurement Techniques, vol. 23, No. 5, May 1980, (New York, US), V. P. Petrov et al.: "Method of Mutual Compensation for the Errors of Angle Transducers", pp. 399–400.

Primary Examiner—Vinh T. Luong
Attorney, Agent, or Firm—Oliff & Berridge

[57] ABSTRACT

A system for calibrating a rotary table (10) includes an indexing table (20) (which is a Hirth coupling table) and an angular interferometer (100), together with a control (200). The indexing table is mechanically coupled to the rotary table (this being the only connection between the rotary table to be calibrated and the calibration system), and the interferometer is set up to measure rotation of the indexing table. During rotation of the rotary table (10) to a target angle, the control (200) monitors the interferometer reading, and when this reading exceeds a predetermined threshold, actuates a drive motor (240) of the table (20) to counter rotate the table, thereby to maintain the optics (106) of the interferometer in alignment with the laser beams (L2, L3) and thus enable continuous measurement of the position of the indexing table.

7 Claims, 4 Drawing Sheets

APPARATUS FOR CALIBRATION OF AN ANGULAR DISPLACEMENT

BACKGROUND OF THE INVENTION

1. Field of the Invention

The present invention relates to the calibration of angular displacement of an object about a rotary axis, such as a rotary table.

2. Description of Related Art

It is known to calibrate a rotary table using an angular interferometer together with an indexing table which is mounted co-axially with the rotary table, and which may rotate relative to the rotary table in equi-angular and accurately known indexable increments which are mechanically defined by the construction of the table. Angular displacement of the rotary table may be measured by the angular interferometer by detecting rotation of a pair of retroreflectors mounted on the indexing table (when the indexing table rotates with the rotary table). The angular interferometer may detect rotary displacement over a range of about ±15° from a datum position (which is the position at which the plane of the two retroreflectors lies exactly perpendicular to the incident of beams of the angular interferometer).

The calibration operation using this apparatus is performed by coupling the indexing table to the rotary table (and therefore coupling the retroreflectors of the angular interferometer to the rotary table); rotating the rotary table to a predetermined target angular displacement; decoupling the indexing table and counter-rotating the indexing table by a number of indexing positions which is approximately equal to the target angular displacement of the rotary table; and interpolating with the interferometer any net angular displacement of the retroreflectors from the datum position. The counter-angular displacement of the indexing table (which is accurately known from the indexed construction of the indexing table), is then summed with the net angular displacement measured by the interferometer and compared with the predetermined target angular displacement of the rotary table. A difference between these two values represents the error in the rotary table at the predetermined target angular displacement.

One problem with such a table occurs when the target angle of the rotary table exceeds the maximum angular displacement which the interferometer may continuously measure (typically ±15°). One proposed solution to this problem has been to prevent rotation of the indexing table relative to the datum during rotation of the rotary table; i.e. the indexing and rotary tables are uncoupled during rotation of the rotary table to its target angle and the indexing table is mechanically retained at a position which lies within a few degrees of the datum, so that the indexing table effectively simultaneously counter-rotates relative to the rotary table. This method is inconvenient for the user.

SUMMARY OF THE INVENTION

The present invention provides a method and apparatus for measuring angular displacement of a rotary table using an angular interferometer, having a pair of retroreflectors mounted on the rotary table via an intermediate indexing table, in which: a control system is provided to monitor the angular interferometer readings to measure rotation of the indexing table, so that when, during rotation of the rotary table to a target angle, rotation of the retroreflectors exceeds a predetermined threshold, a motor is actuated to counter-rotate the indexing table and thus maintain the retroreflectors within the requisite range of angular displacement.

A first aspect of the present invention provides an apparatus for measuring angular displacement of a rotatable support of a rotary table, the support being mounted to a base for rotation relative thereto about an axis, the apparatus comprising:

an indexing table including a stator which, in use is mounted to the support of the rotary table, and a rotor rotatable relative to the stator between a plurality of mechanically defined descrete indexed angular rest positions;

an angular interferometer for measuring angular displacement of said rotor of said indexing table;

a motor for rotating said rotor relative to said stator in response to a control signal;

a control for supplying a said control signal to control rotation of said rotor in dependence upon the rotation of said rotor relative to said base, wherein said control comprises: means for receiving a value of angular displacement from said interferometer and for determining whether said value is equal to or exceeds a predetermined threshold value, and means for generating a said control signal in response to said value equalling or exceeding said predetermined threshold value to cause said motor to counter-rotate said rotor.

The speed of counter rotation must be such that, by the time the support has attained its target angle, the interferometer is still able to measure the angular displacement of the rotor.

In one preferred embodiment the control system counter-rotates the rotor of the indexing table at a faster speed than the speed of rotation of the support, and in a series of descrete angular increments whose magnitude is typically twice the threshold value. For example, in a system in which the indexing table has repeatable and accurate indexing positions spaced at 5° intervals, and the angular interferometer may measure up to a range of angles ±15° from the datum position, the threshold displacement of the rotary table is approximately 3½°, and the magnitude of counter-rotation of the indexing table is approximately 5° to 6°.

An embodiment of the invention will now be described, by way of example, and with reference to the accompanying drawings in which:

DESCRIPTION OF THE PREFERRED EMBODIMENTS

Figure 1:
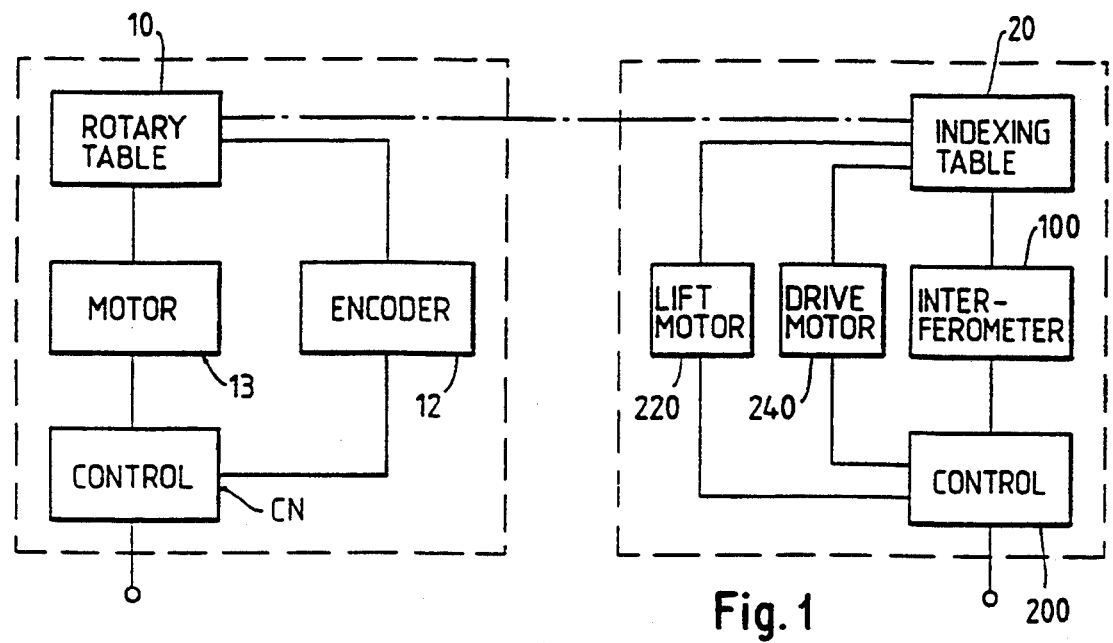
FIG. 1 is a schematic illustration of a calibration system.

The system of the present invention is illustrated schematically in FIG. 1. Referring now to FIG. 1, the rotary table 10 to be calibrated includes an encoder 12 which measures angular displacement and sends displacement signals to a control CN. Using the angular displacement signals the control CN operates the motor to rotate the table 10 to predetermined values of angular displacement at which calibration values are required in accordance with a pre-programmed routine entered into the control CN via input port 16.

The calibration apparatus includes an indexing table 20, mounted on the rotary table 10 for rotation therewith, and an angular interferometer 100 used to measure angular displacement of the indexing table 20. A control 200 operates lift motor 220 (which uncouples the indexing table 20) and drive motor 240 (which rotates the indexing table 20 when uncoupled) in dependence upon the signals from the angular interferometer system 100 and the aforementioned pre-programmed calibration routine. It is thus a feature of the method and system of the present invention that the only link between the calibration apparatus and the rotary table 10 to be calibrated is the mechanical mounting of the indexing table 20 on the rotary table 10. No dedicated electrical connections, or information links between systems are required.

Figure 2A:
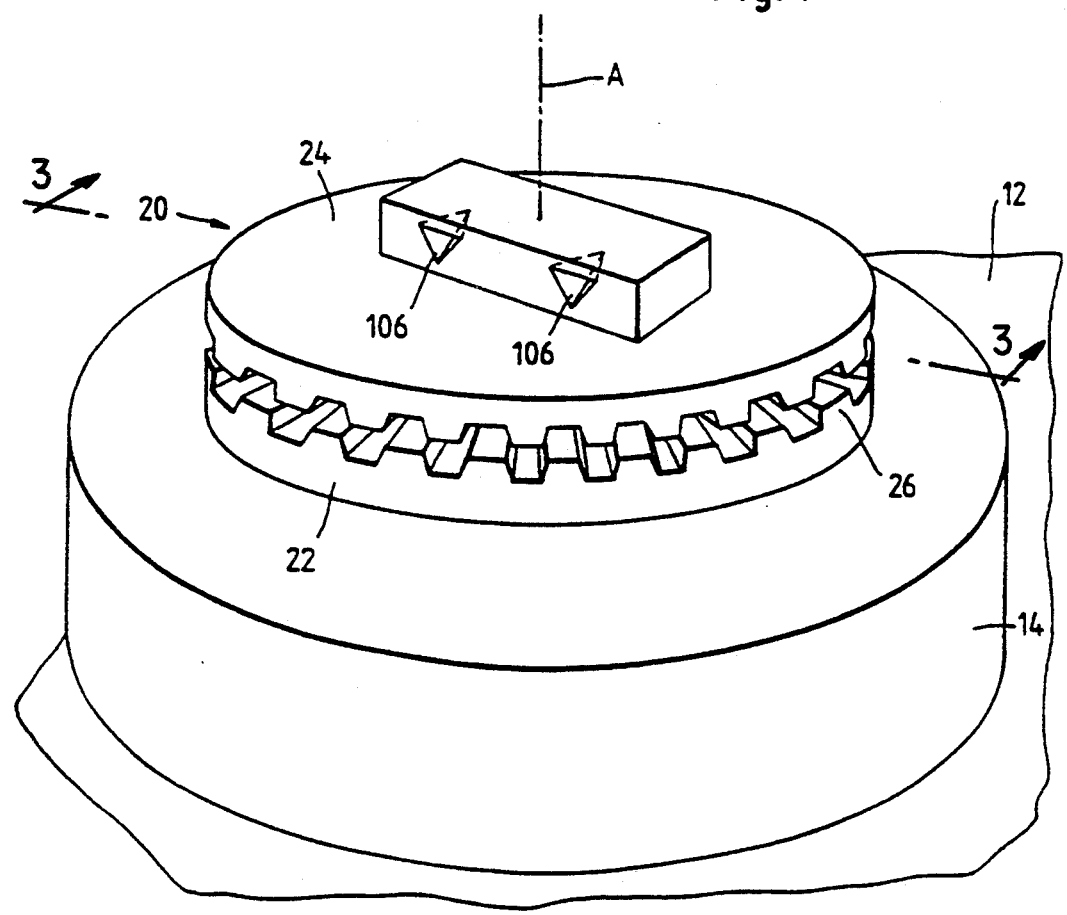
FIG. 2A is a perspective view of a rotary table, indexing table with the rotor and stator separated and angular interferometer optics.
Figure 2B:
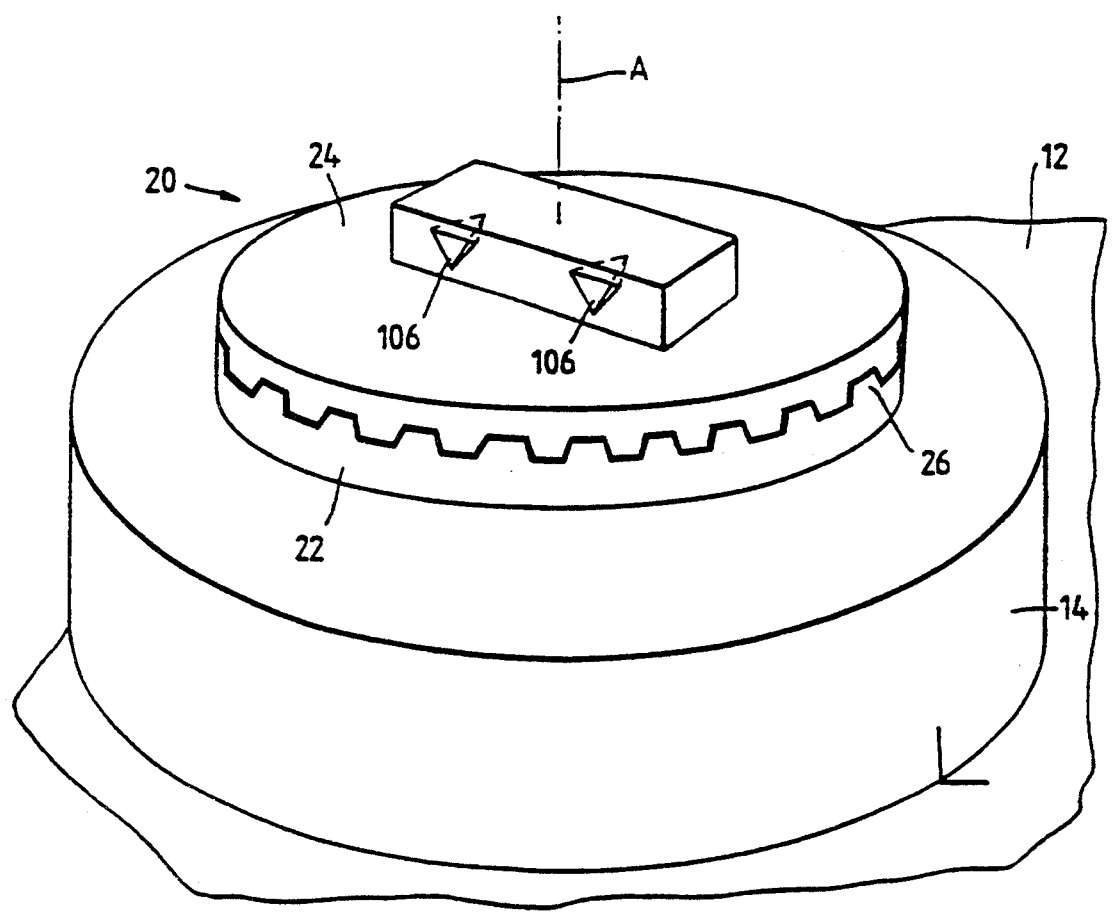
FIG. 2B is a perspective view of the rotary table, indexing table with a rotor and stator engaged and the angular interferometer optics.
Figure 2C:
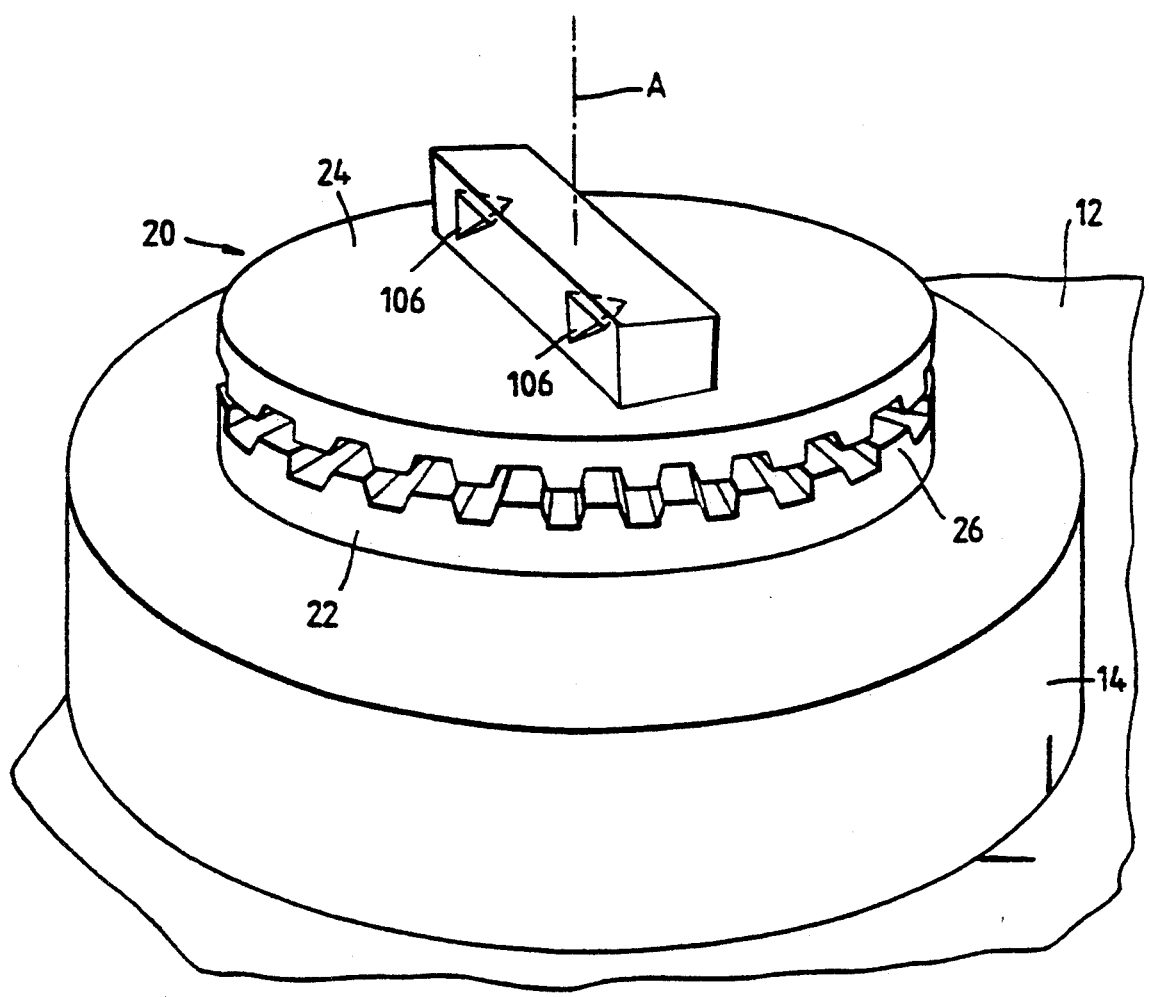
FIG. 2C is a perspective view of the support of the rotary table and stator rotated counterclockwise and the rotor rotated clockwise (the relationships exaggerated for explanation)

Referring now to FIG. 2, a rotary table 10 comprises a base 12 to which a rotatable support 14 is mounted for rotation relative to the base 12 about an axis A. An intermediate indexing table 20 comprises a stator 22 which is fixedly mounted to the support 14 of the rotary table, and a rotor 24 mounted to the stator 22 for rotation about an axis which is substantially co-axial with the axis A. The intermediate indexing table 20 is a Hirth coupling (known per se) with gear teeth 26 provided on both the rotor 24 and stator 22 at accurately equi-angular indexed rest positions for the rotor 24 relative to the stator 22. Rotation of the rotor 24 relative to the stator 22 is achieved by axial uncoupling of the rotor 24 and stator 22 to permit disengagement of the gear teeth 26 (FIG. 2A). Thus far, such a Hirth coupling table is known per se.

Figure 3:
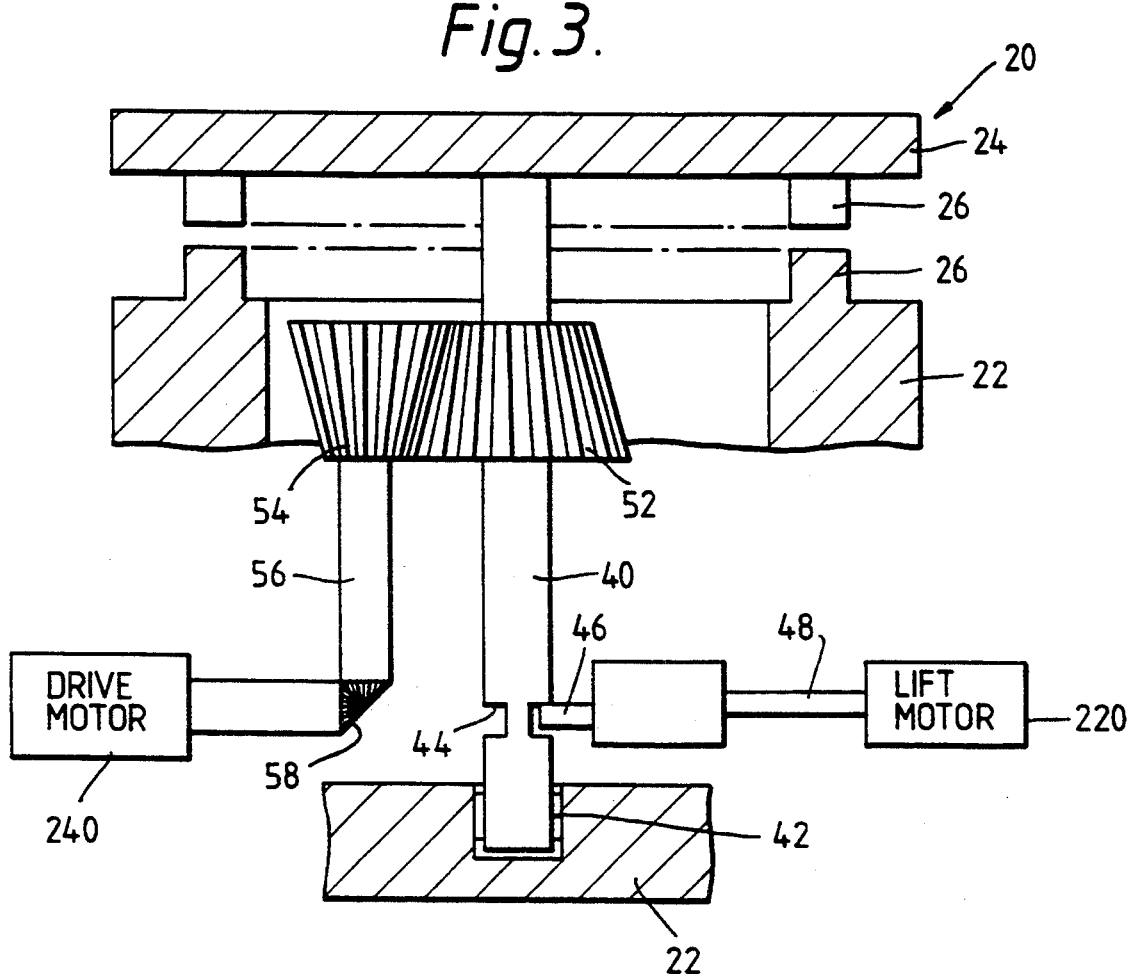
FIG. 3 is a detailed section through the indexing table of FIGS. 2 along line 3—3.

Referring now to FIG. 3, the Hirth coupling indexing table 20 of the present invention will now be described. The table comprises a central shaft 40 fixedly connected to the rotor 24, and mounted on the stator 22 via a bearing 42. The central shaft 40 has a circumferentially extending channel 44 at its base which accommodates a cylindrical bearing 46, eccentrically mounted to the drive shaft 48 of the lift motor 220. Rotation of drive shaft 48 causes the cylindrical bearing 46 to operate as a cam in the channel 44, urging the central shaft 40 (and thus the rotor 24) upwards, or downwards thereby disengaging or engaging the gear teeth 26 respectively. A microswitch (not shown) is provided to determine whether or not the rotor 24 has been lifted, and engagement of the gear teeth is determined by the microswitch and the stalling of the lift motor 220 (the combination of these last two conditions ensuring that the teeth 26 are both properly aligned and urged into engagement with each other).

The rotor is rotated by a drive system which includes a conical driven gear 52, mounted coaxially with central shaft 40, which engages a conical drive cog 54. Drive cog 54 is in turn mounted on rotary drive shaft 56 driven via a worm gear 58 by rotary motor 240. The conical gear 52 and cog 54 are configured so that, when the rotor 24 is engaged with the stator 22 (FIG. 2B), the gear teeth of cog 54 and gear 52 are very loosely meshed, thus allowing the position of the rotor 24 to be determined solely by the teeth 26 of the Hirth coupling. However, when the rotor 24 is lifted (FIGS. 2A, 2C and 4) the gear 52 and cog 54 become relatively deeply meshed. This causes the rotor 24 and stator 22 to rotate together in the absence of any drive from motor 240 when the rotor 24 and stator 22 are uncoupled, a consequence of which is that rotor 24 will also inevitably rotate with support 14 of the rotary table 10 in this condition.

An optical element containing a pair of retroreflectors 106 is mounted on the rotor 24. The retroreflectors 106 form part of an angular interferometer system 100 which will now be described with reference to FIG. 4.

Figure 4:
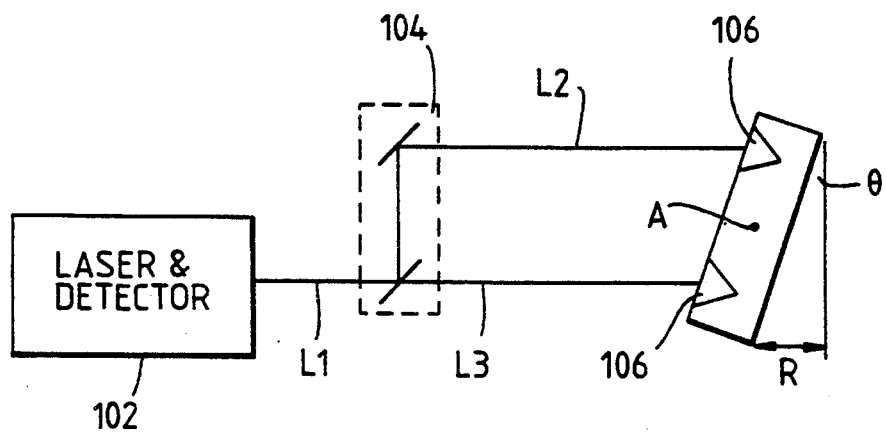
FIG. 4 shows an angular interferometer system.

Referring now to FIG. 4, an angular interferometer system 100 comprises a laser 102 which emits a laser beam L1. The beam L1 is split by a beam splitter arrangement 104 into two parallel beams L2 and L3. The beams L2 and L3 are incident on retroreflectors 106, and consequently returned upon their incident paths to interfere with each other at a detector (not shown). Rotation of the retroreflectors 106 about axis A, (as a result of rotation of the rotor 24 of the intermediate indexing table 20, FIG. 2C) causes a shift in the interference fringes at the detector. If the interferometer 100 has been datumed with the retroreflectors 106 lying in a plane exactly perpendicular to the incoming beams L2 and L3 the following equation holds true:

$$R = k \sin \Theta$$

Where:

$\Theta$ is the angular displacement

R is the number (not necessarily a whole number) of shifted interference fringes corresponding to the angle $\Theta$; and k is known as the scale factor and:

$$k = Dn/\lambda_0$$

Where:

D is the distance between the retroreflectors 106;

n is the refractive index of air, $\lambda_0$ is the wave length of the laser light in a vacuum.

In practice however, the plane in which the retroreflectors 106 lie is never exactly perpendicular to the incoming beams L2 and L3 and the behaviour of the apparatus is correctly described by the following equation:

$$R + R_0 = k \sin (\Theta - \Theta_0) \tag{1}$$

where:

$\Theta$ is angular displacement of the retroreflectors (usually concomitant with angular displacement of the rotary table as controlled and measured by the control system of that table);

R is the interferometer reading corresponding to the angle $\Theta$;

$\Theta_0$ is the offset in $\Theta$ at the datum position;

$R_0$ is the offset in R at the datum position; and k is the scale factor.

This equation can be written in the form:

$$R+R_o = A \sin \Theta + B \cos \Theta \quad (2)$$

where:

$$A = k \cos \Theta_o$$

$$B = k \sin e \Theta_o$$

N.B. A & B are thus constants for a given system configuration.

Now $\Theta_o$ may be measured directly as may the parameters upon which k is dependent. However, there is an error associated with each of these measurements, which are in any case time consuming.

It is therefore preferable to obtain values for A,B and k by the following method:
from Equation (2) two further orthogonal equations may be obtained:

$$R \sin \Theta + R_o \sin \Theta = A \sin^2 \Theta + B \sin \Theta \cos \Theta \quad (3)$$

$$R \cos \Theta + R_o \cos \Theta = A \sin \Theta \cos \Theta + B \cos^2 \Theta \quad (4)$$

Summing all readings taken for each of the parameters:

$$\Sigma R + NR_o = \Sigma A \sin \Theta + \Sigma B \cos \Theta \quad (5)$$

$$\Sigma R \sin \Theta + \Sigma R_o \sin \Theta = \Sigma A \sin^2 \Theta + \Sigma B \sin \Theta \cos \Theta \quad (6)$$

$$\Sigma R \cos \Theta + \Sigma R_o \cos \Theta = \Sigma A \sin \Theta \cos \Theta + \Sigma B \cos^2 \Theta \quad (7)$$

If the angular displacements are symmetrically about the 0°0 datum position then terms containing sin Θ disappear, since:

$$\sin(-\Theta) = -\sin \Theta$$

and we are therefore left with $$\Sigma R + NR_o = \Sigma B \cos \Theta \quad (8)$$

$$\Sigma R \sin \Theta = \Sigma A \sin^2 \Theta \quad (9)$$

$$\Sigma R \cos \Theta + \Sigma R_o \cos \Theta = \Sigma B \cos^2 \Theta \quad (10)$$

The value of A can be obtained directly from equation (9). We are then left with simultaneous equations (8) and (10) which can be solved for B and $R_o$.

Data for the solution to equations (8) to (10) is obtained by using the indexing table 14 to provide angular displacements of the retroreflectors (i.e. values of $\Theta$).

Because the table 20 provides accurate displacement of rotor 24 at intervals of 5°, the values of $\Theta$ obtained by this method will be sufficiently accurate to use them to calculate A and B, unlike values of $\Theta$ obtained by rotation of the rotary table.

Interferometer readings (R) are therefore taken with the rotor 24 of table 20 at −5°, 0°, and +5° positions, to give a series of accurate, and symmetrical values of $\Theta$ (−5°, 0°, +5°) and R. Having used these readings to obtain values of A and B, the apparatus is now set up, and calibration of the rotary table may now be performed.

A calibration operation in which the target angular displacement of the rotary table 10 exceeds the 15° range over which the interferometer system 100 may continuously measure angular displacement will now be described with reference to FIGS. 1, 2A–2C and 3. The rotor 24 and stator 22 of the intermediate table 20 (FIG. 2B) are uncoupled from each other (FIGS. 2A and 3), and the rotary table 10 is then rotated by its control system CN to the target angle at which calibration is required, for example 45°. As the support 14 of the rotary table 10 rotates, both the stator 22 and rotor 24 on the intermediate table and the retroreflectors 106 rotate with the support 14 of the rotary table 10 due to meshing of gear 52 and cog 54. When the angular displacement of the retroreflectors 106 as measured by the interferometer reaches a threshold of 2½° the control system 200 operates the motor 240, which rotates the rotor 24 relative to the stator 22, to counter-rotate the rotor 24 by approximately 5°. During counter-rotation of the rotor 24 the support 14 of the rotary table 10 continues to rotate (FIG. 2C. The index lines on support 14 and base 12 of FIGS. 2B and 2C being provided only to visually present their relative movement), and therefore the motor 240 should preferably be able to counter-rotate the rotor 24 faster than the support 14 of the rotary table 10 is driven to its target angle. However, counter rotation at a speed equal to, or less than the speed of rotation of the support is also possible, provided that when the support reaches its target angle the angular interferometer can still measure the position of the rotor; i.e. the total displacement of the retroreflectors from the datum position, as a result of the counter-rotation of the rotor progressively lagging rotation of the support does not exceed approximately 15°.

The procedure of counter-rotating the rotor 24 of the intermediate table 20 is repeated a further 9 times during rotation of the rotary table 10 to its target angle of 45°. When the rotary table reaches its target angle, (NB the control 200 determines this from the total angular displacement of the rotor 24 as measured by the interferometer in conjunction with the pre-programmed calibration routine) the control actuates motor 220 to lock the rotor 24 into engagement with the stator 22 (FIG. 2A). The rotor 24 will then have been rotated by exactly 45° relative to the stator 22 since the 5° indexing increments on the table 20 are considered to be accurate. Once the rotor 24 and stator 22 of the intermediate indexing table 20 have been coupled together, an interferometer reading is taken to determine any net displacement of the retroreflectors 106 from the datum position. Any such displacement represents the error in the rotary table control system at the target angle of 45°. This procedure may be repeated for various other target angles in the rotary table as desired, until all required angular displacements have been calibrated.

Counter-rotating the rotor 24 in descrete steps is a convenient method of maintaining the interferometer alignment irrespective of the rotational speed of the rotary table to be calibrated (which may differ from table to table). It is of course possible to counter-rotate the rotor at the same speed as the rotary table.

The system has been described using a Hirth coupled table. The performance requirement for this table is that it should have a set of well defined angular positions. The angular separation between each of these well defined positions need not necessarily be equal. All that is required are repeatable angular separations between rest positions which are known and have the desired level of accuracy. (N.B. these positions may be different for clock-wise and counter clockwise rotations). If such a table is used, then the mathematics used for calibrating the laser interferometer system is slightly more complicated, but is easily derivable from equation 1. During the calibration of the rotary table, calibration is made between known angular positions of the indexing table.

We claim:

1. Apparatus for measuring angular displacement of a support mounted for rotation relative to a base of a rotary table, the apparatus comprising:
   an indexing table including a stator which, in use, is mounted to the support of the rotary table, and a rotor rotatable relative to the stator between a plurality of discrete angular rest positions;
   an angular interferometer for measuring angular displacement of said rotor of said indexing table;
   a motor provided on said indexing table for rotating said rotor relative to said stator in response to a control signal; and
   a control for;
   (a) receiving a value of angular displacement from said interferometer;
   (b) determining whether said value is equal to or exceeds a predetermined threshold value; and
   (c) generating said control signal in response to said value equalling or exceeding said predetermined threshold value to cause said motor to counter-rotate said rotor.

2. The apparatus according to claim 1, wherein each of said discrete angular rest positions of said indexing table are mechanically defined.

3. The apparatus according to claim 2, comprising means for engaging said rotor into a one of said mechanically defined rest positions, and disengaging said rotor from said one of said mechanically defined rest positions to enable said motor to rotate said rotor between said mechanically defined rest positions, and wherein means are provided for constraining said rotor to rotate with said stator when said stator and rotor are disengaged and said motor is not actuated by said control to rotate said rotor.

4. The apparatus according to claim 3, wherein said mechanically defined rest positions are spaced at equi-angular intervals.

5. The apparatus according to claim 4, wherein said mechanically defined rest positions are provided by a first set of teeth on said rotor which are engageable with a second set of teeth on said stator.

6. The apparatus according to claim 3, wherein said rotor and stator are rotatable relative to each other about an axis, and wherein said rotor and stator are axially engageable and disengageable.

7. The apparatus according to claim 3, further comprising a lift motor for performing said engagement and disengagement of said rotor and support.

* * * * *